(12) United States Patent
Lavenne et al.

(10) Patent No.: US 7,817,891 B2
(45) Date of Patent: Oct. 19, 2010

(54) METHOD FOR ACCESSING OPTICAL FIBERS WITHIN A TELECOMMUNICATION CABLE

(75) Inventors: Alain Lavenne, Calais (FR); Olivier Tatat, Sangatte (FR); Jean-Pierre Bonicel, Rueil Malmaison (FR)

(73) Assignee: Draka Comteq, B.V., Amsterdam (NL)

(*) Notice: Subject to any disclaimer, the term of this patent is extended or adjusted under 35 U.S.C. 154(b) by 238 days.

(21) Appl. No.: 12/101,528

(22) Filed: Apr. 11, 2008

(65) Prior Publication Data
US 2009/0041414 A1 Feb. 12, 2009

(30) Foreign Application Priority Data
Apr. 11, 2007 (FR) .................................. 07 02624

(51) Int. Cl.
*G02B 6/44* (2006.01)
*G02B 6/00* (2006.01)
(52) U.S. Cl. ........................ 385/109; 385/100; 385/113; 385/134
(58) Field of Classification Search ................. 385/100, 385/109, 110, 113, 134; 356/73.1
See application file for complete search history.

(56) References Cited

U.S. PATENT DOCUMENTS

| | | | |
|---|---|---|---|
| 5,093,992 A | 3/1992 | Temple, Jr. et al. | |
| 5,140,751 A | 8/1992 | Faust | |
| 5,155,789 A | 10/1992 | Le Noane et al. | |
| 5,671,312 A | 9/1997 | Jamet | |
| 6,134,363 A | 10/2000 | Hinson et al. | |
| 6,181,857 B1 | 1/2001 | Emeterio et al. | |
| 2002/0126968 A1 | 9/2002 | Witt | |

FOREIGN PATENT DOCUMENTS

| | | |
|---|---|---|
| EP | 0822427 A | 2/1998 |
| EP | 1052533 A | 11/2000 |
| EP | 1980887 A1 | 10/2008 |
| FR | 2665266 A1 | 1/1992 |
| FR | 2706218 A1 | 12/1994 |

OTHER PUBLICATIONS

French Search Report and Written Opinion in corresponding French Application Serial No. 0702624, dated Nov. 16, 2007.
Commonly assigned U.S. Appl. No. 11/938,280, filed Nov. 10, 2007.
European Search Report in counterpart European Application No. 08007134, dated May 26, 2008 [All documents listed in Search Report previously cited in IDS filed on Jul. 31, 2008].
European Patent Office Notification of Intention to Grant in counterpart European Patent Application No. 08007134, dated Mar. 8, 2010.

*Primary Examiner*—Mark A Robinson
*Assistant Examiner*—Michael P Mooney
(74) *Attorney, Agent, or Firm*—Summa, Additon & Ashe, P.A.

(57) ABSTRACT

Disclosed is a method accessing one or more optical fibers in a telecommunication cable in a way that considerably reduces the risk of damaging the optical fibers. To avoid inadvertent damage caused by a cutting tool, the method includes moving optical fibers and/or micromodules away from the area on the cable that is to be cut.

19 Claims, 8 Drawing Sheets

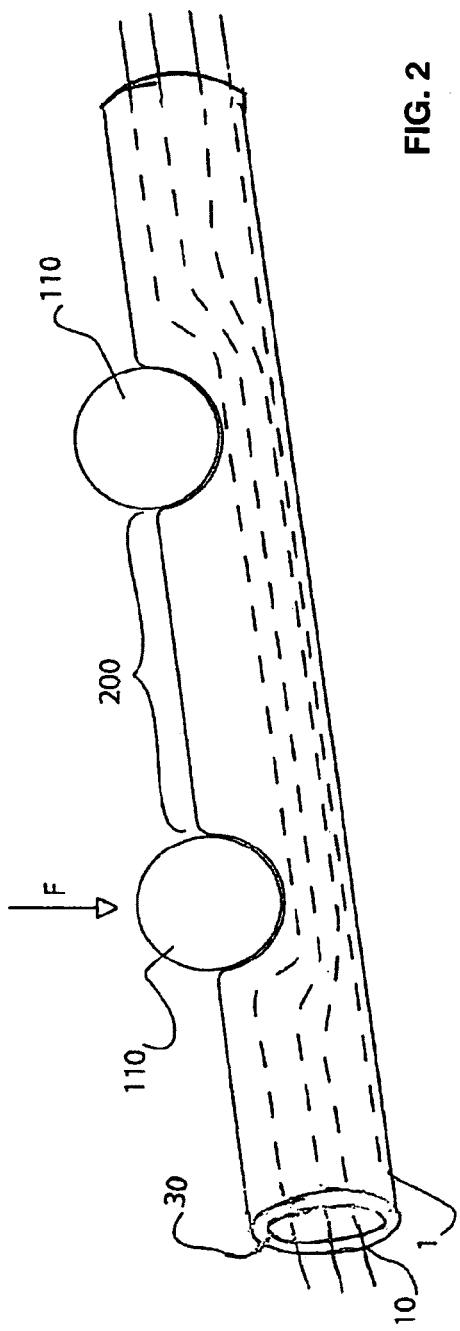
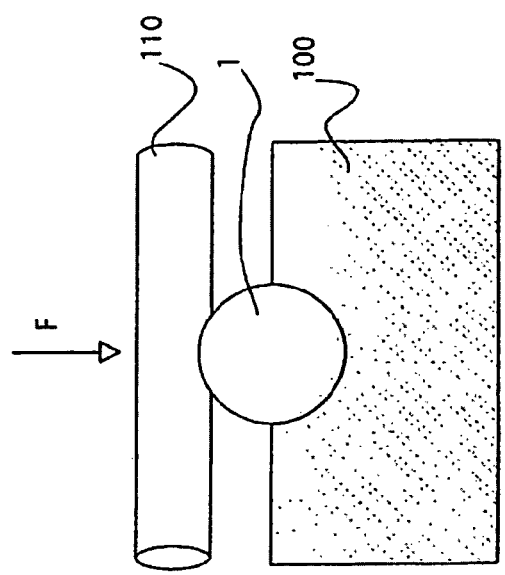

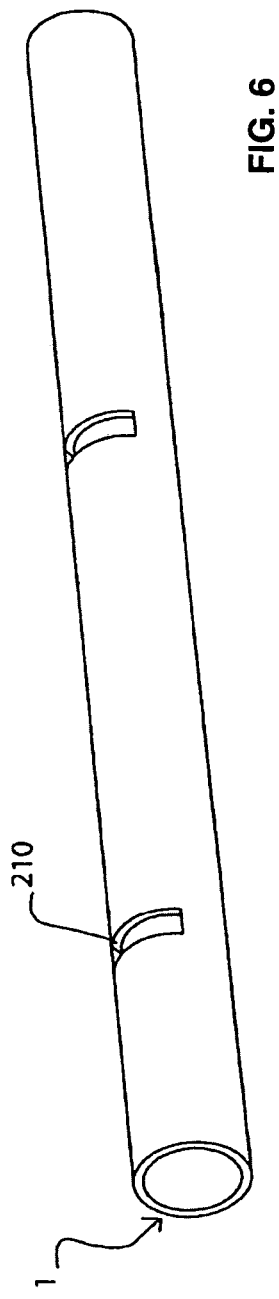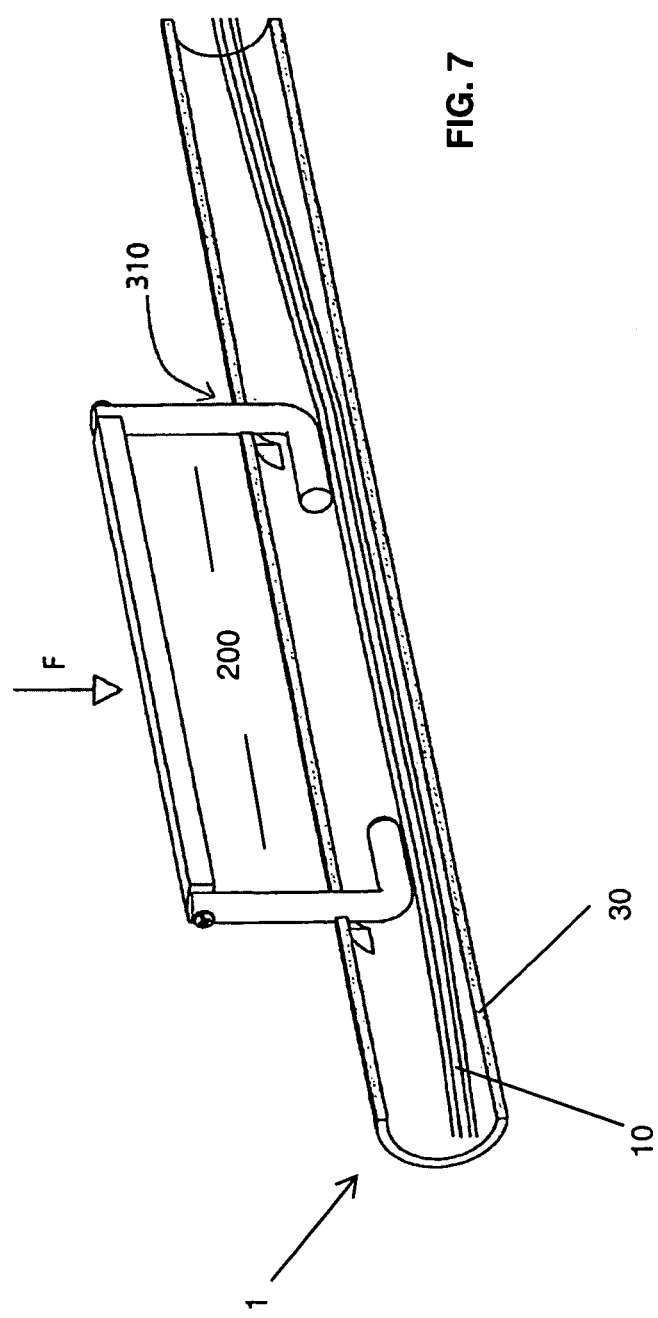

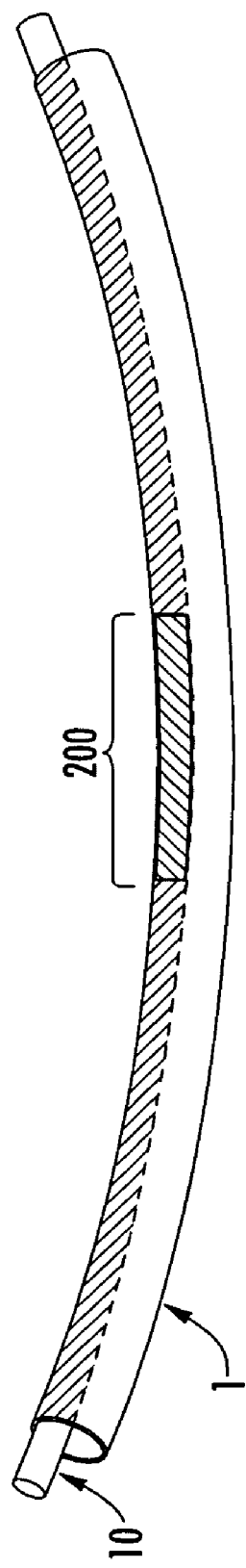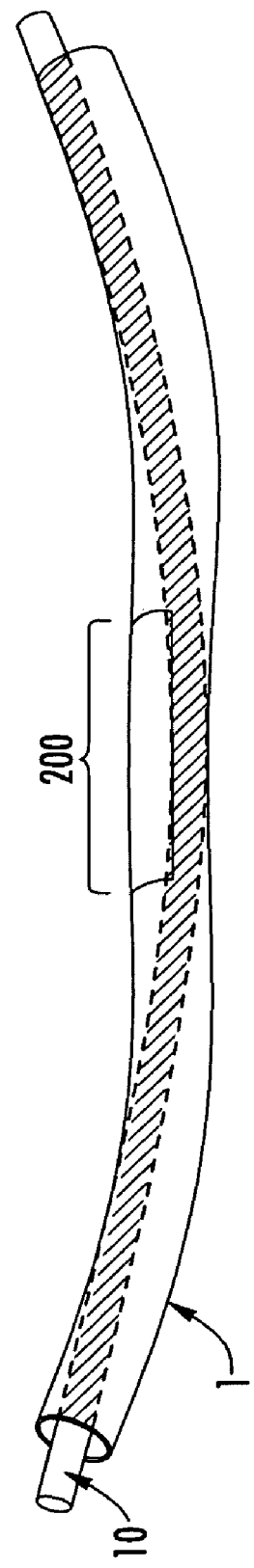

METHOD FOR ACCESSING OPTICAL FIBERS WITHIN A TELECOMMUNICATION CABLE

CROSS-REFERENCE TO PRIORITY APPLICATION

This application claims the benefit of pending French Application No. 07/02624 (filed Apr. 11, 2007, at the French Patent Office) via 35 U.S.C. §119. French Application No. 07/02624 is hereby incorporated by reference in its entirety.

FIELD OF THE INVENTION

The present invention relates to the field of optical fiber telecommunication cables and, more particularly, to so-called micromodule cables in which optical fibers are grouped to form a plurality of micromodules gathered together as a cable.

BACKGROUND OF THE INVENTION

Optical fiber cables that include several optical fiber micromodules are known. For example, French Patent Application No. FR 2,665,266 and its counterpart U.S. Pat. No. 5,155,789, which is hereby incorporated by reference in its entirety, and French Patent Application No. FR 2,706,218, and its counterpart U.S. Pat. No. 5,671,312, which is hereby incorporated by reference in its entirety, disclose an optical fiber micromodule surrounded by a retaining jacket enclosing several optical fibers.

A micromodule telecommunication cable includes a plurality of optical fibers grouped in micromodules. The micromodules are typically disposed in a central cavity of the cable such that the cable jacket surrounds the micromodules. This central cavity is surrounded by a jacket. A micromodule may contain about 2 to 24 optical fibers enclosed in a thin, flexible retaining jacket. The retaining jackets of the micromodules and the jackets of optical fibers may be colored to facilitate locating the optical fibers within the cable (e.g., during connection operations).

With the development of telecommunications systems with optical fibers to the subscriber, commonly known as Fiber-to-the-Home (FTTH) or Fiber-to-the-Curb (FTTC), it is desirable to produce cables with sufficient capacity to contain numerous optical fibers (e.g., grouped in micromodules). In this regard, such cables should allow an individual access to each micromodule for distribution in a given building. For this purpose, a field technician makes a bypass in the telecommunication cable. At least one aperture or insertion window is made in the outer jacket of the cable in order to access the interior of the cable. Consequently, one or more optical fibers present in one or more micromodule are cut and drawn from the cable through an insertion window to make a connection to a given optical system in a given building.

European Patent Application No. EP 1,052,533 and its counterpart U.S. Pat. No. 6,181,857, which is hereby incorporated by reference in its entirety, describes a method for accessing one or more optical fibers in a cable for bypassing optical fibers toward an optical system. Two cutouts are made in the cable jacket in order to create a first insertion window through which an optical fiber is cut and a second insertion window through which the cut optical fiber is drawn (i.e., bypassed).

U.S. Pat. No. 6,134,363, which is hereby incorporated by reference in its entirety, describes a method for accessing one or more optical fibers freely positioned in a cable. The cable jacket is stripped on either side of peripheral strength members over a given length to create a window for accessing the optical fibers.

U.S. Pat. No. 5,140,751, which is hereby incorporated by reference in its entirety, describes a tool for accessing one or more optical fibers positioned in a tube framed by strength members. The tool has suitable grooves for receiving the tube and the strength members, respectively. A blade then cuts the tube over a given length to create an insertion window for accessing the optical fibers.

The methods and tools described in the aforementioned patent documents, however, do not provide any particular step for protecting the optical fibers or micromodules during the cutting of the bypass insertion windows. In particular, when the filling rate of the central core (i.e., the optical fiber count) is significant, the cutting tool may penetrate the central core and damage optical fibers contained therein.

U.S. Pat. No. 5,093,992, which is hereby incorporated by reference in its entirety, proposes a tool in which the tube containing one or more optical fibers is bent. A blade then cuts the tube along a tangent to the curvature of the tube in a way that prevents optical fibers from being touched by the blade. This tool, however, is complex and unsuitable for a large capacity cable containing several micromodules and having a significant filling rate.

U.S. Patent Application Publication No. 2002/0126968, which is hereby incorporated by reference in its entirety, describes a cutting tool for an optical cable having an outer sheath, a central cavity, and optical waveguides that are surrounded by a tape. The cutting tool cuts through the outer sheath and penetrates into the central cavity.

European Patent Application No. EP 0,822,427 describes a tool for opening the protective tube of an optical fiber cable. The disclosed tool includes a body, a guide, a cutting edge, and a pulley for bending the optical fiber.

There is a need, therefore, for a method for accessing one or more optical fibers in a telecommunication cable in a way that not only avoids the risk of damaging the optical fibers but also is uncomplicated to employ for various kinds of telecommunication cables.

SUMMARY OF THE INVENTION

Accordingly, in one aspect, the present invention embraces a method in which optical fibers contained in a central cable core are pushed away prior to cutting one or more access windows in the cable jacket.

In one exemplary embodiment, the present invention is a method for accessing one or more optical fibers of a telecommunication cable that includes a plurality of optical fibers freely positioned in a central cable core. The method includes (i) identifying a cutout area on the outer periphery of the cable jacket (i.e., to create an access window);

(ii) pushing away the optical fibers (or micromodules containing optical fibers) to a section of the central cable core opposite the cutout area by exerting on the optical fibers a force having a radial component (i.e., a radial-displacement force with respect to the cable); and (iii) cutting from the cable jacket a cutout area to form an access window while maintaining a force on the optical fibers. The displacement force should be sufficient to reposition and maintain the optical fibers (and/or micromodules) in a section of the central cable core that is opposite the cutout area but is not necessarily of constant magnitude.

In accordance with the foregoing, the optical fibers (or micromodules containing optical fibers) are pushed away from (i.e., pushed back) a portion of the cable jacket on which the cutout area is defined. The optical fibers (or optical fibers grouped in at least one micromodule) are relocated to (i.e., pushed toward) a section of the central cable core that is opposite the cutout area. For example, if one or more cutout areas are defined on the cable jacket surrounding the upper volume of the central cable core, the optical fibers (or micromodules) are pushed to a lower section of the central core (i.e., radially displaced). The force applied to the optical fibers (or micromodules) is typically a substantially radial force with respect to the cable jacket.

In another exemplary embodiment, the optical fibers (and/or micromodules) are pushed away from the cable jacket by exerting a force on the outer periphery of a flexible, deformable cable jacket. This applied force deforms the cable jacket, which, in turn, pushes the optical fibers from the cutout area(s).

In another exemplary embodiment, the optical fibers (and/or micromodules) are pushed away from the cable jacket by a force exerted through at least one insertion window made in the cable jacket. Thus, an insertion window is made in the cable jacket, typically fully or partially within the cutout area. A force is then exerted upon the optical fibers through the insertion window (e.g., using a pushing tool). In this regard, the insertion window is substantially smaller than the cutout area (and the subsequent access window).

This embodiment is useful, for example, for cables having non-flexible jackets that are not readily deformable. In such circumstances, the optical fibers cannot be pushed away by exerting a force on the outer periphery of the cable jacket. Consequently, the force needs to be exerted directly on the optical fibers (or micromodules) via an opening in the cable jacket (e.g., an insertion window).

It is within the scope of the invention to form the insertion window(s) outside of the delineated cutout area (e.g., near and/or adjacent to the cutout area) as long as the insertion window(s) are capable of achieving their purpose (i.e., to facilitate the displacement of the optical fibers and/or micromodules, typically using a pushing tool). It is further within the scope of the invention to form two or more access windows within two or more cutout areas, such as via respective insertion windows.

In yet another exemplary embodiment, the insertion window made in the cable jacket is sufficiently large to facilitate the use of a pushing tool, which can directly exert a displacement force on the optical fibers (or micromodules) in the cable. In other words, the insertion window is suitable for receiving such a pushing tool (e.g., having an area between four and ten square millimeters).

In yet another exemplary embodiment, the optical fibers (and/or micromodules) are pushed away from the cable jacket by forces exerted in at least two different points on the cable. These two points roughly correspond to the cutout area. In particular, discrete forces are applied to the cable jacket at two longitudinally distant points typically located at or near the longitudinal ends of the cutout area. In this embodiment, the optical fibers (or micromodules) can be optimally displaced so that a large access window can be formed in the cable jacket in one single cutting operation.

In yet another exemplary embodiment, the central cable core is surrounded by a protective envelope positioned inside the cable jacket. Optionally, a metal sheath is present between the protective envelope and the cable jacket.

In yet another exemplary embodiment, the steps of pushing away the optical fibers (or micromodule) from the cable jacket and making a cutout in the cable jacket (i.e., creating an access window) are carried out simultaneously. This, for example, may be achieved via a pushing-and-cutting tool that is suitable for (i) deforming the protective envelope around the central cable core to thereby exert a displacement force on the optical fibers (or micromodule) and (ii) piercing (and cutting) the cable jacket (and the optional metal sheath).

In yet another exemplary embodiment, the pushing-and-cutting is a mechanical milling cutter with a conical or rectangular profile. The tool may be calibrated, for instance, to penetrate into the cable beyond the cable jacket (e.g., by one millimeter or more) without penetrating or even damaging the protective envelope.

In yet another exemplary embodiment, the plurality of optical fibers and/or micromodules occupies the central cable core with a filling rate between about 20 percent and 90 percent.

The foregoing, as well as other characteristics and advantages of the invention and the manner in which the same are accomplished, is further specified within the following detailed description and its accompanying drawings.

BRIEF DESCRIPTION OF THE DRAWINGS

FIG. 2 depicts a perspective view of a cable and a pushing tool for applying the method for accessing one or more optical fibers according to one exemplary embodiment of the invention.

FIG. 3 depicts a cross-sectional view of the cable and the pushing tool of FIG. 2.

FIG. 6 depicts a perspective view of a cable prepared for applying the method for accessing one or more optical fibers according to the invention.

FIG. 7 depicts a longitudinal sectional view of the cable of FIG. 6 and a pushing tool for applying the method for accessing one or more optical fibers according to yet another exemplary embodiment of the invention.

FIGS. 11 and 12 depict the cable of FIG. 9 installed and secured for cutting.

DETAILED DESCRIPTION

The present invention is described hereafter with reference to illustrative, non-limiting examples. The illustrated examples are given with reference to a cable with micromodules containing optical fibers. It is understood, however, that the method according to the present invention may also be applied to any other kind of cable, such as a cable containing freely positioned optical fibers and from which an access window is to be cut without cutting through the optical fibers.

That said, the present invention is only applicable to cables having a filling rate that is less than 100 percent to allow for sufficient room in the central cable core for pushing away (i.e., displacing) the optical fibers before cutting the access window. The filling rate is the ratio of (i) the sum of the cross-sectional area of the micromodules, if any, and the cross-sectional area of any optical fibers not grouped in micromodules and (ii) the cross-sectional area of the central cable core.

Figure 1A:
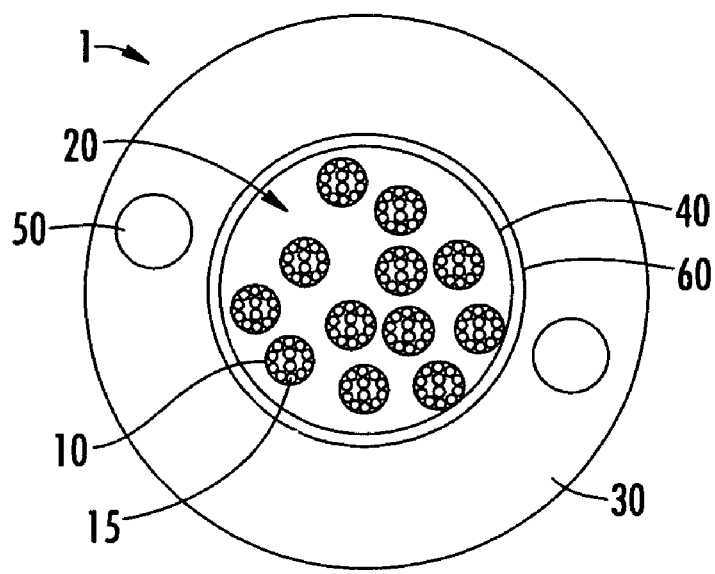
FIG. 1A depicts a cross-sectional view of cable with micromodules.
Figure 1B:
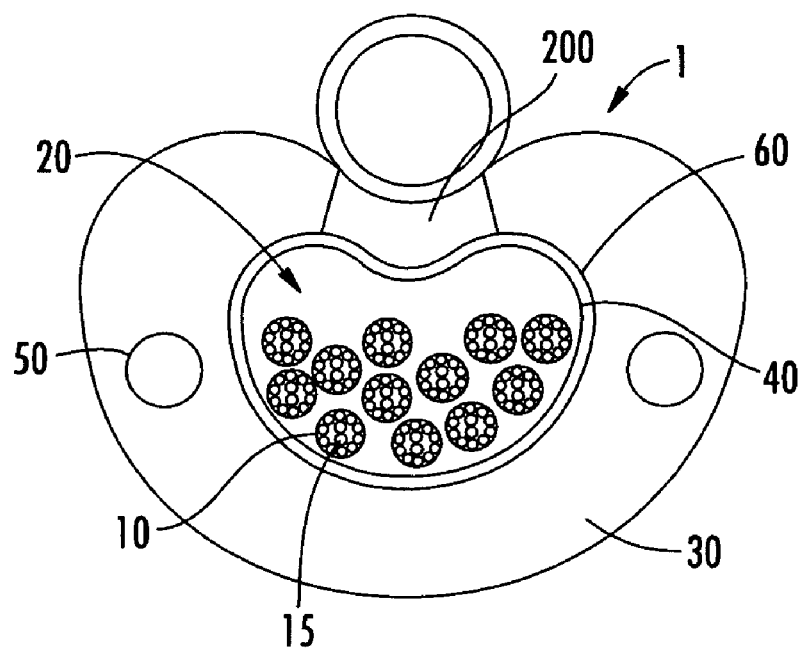
FIG. 1B depicts a cross-sectional view of the cable of FIG. 1A being deformed to thereby displace the micromodules.

FIGS. 1A and 1B schematically depict an exemplary telecommunication cable 1. Cable 1 has a longitudinal central core 20 housing several substantially parallel micromodules 10 (i.e., in the longitudinal direction of the cable 1). The part of the central core 20 that is not occupied by the micromodules 10 is typically empty or may be partially filled with a filler material (e.g., water-swellable yarns or lubricants). Each micromodule 10 groups together several optical fibers 15 that are substantially parallel to each other in a longitudinal direction. "Optical fibers that are substantially parallel to each other" refers to non-cabled optical fibers (i.e., optical fibers that are not wound as spirals or with alternating-SZ pitch).

The jacket 30 is typically polymeric (e.g., formed of high-density polyethylene or HDPE). The jacket 30 possesses good moisture barrier and satisfactory mechanical flexibility. The jacket 30 is typically extruded to form the central core 20 in which the micromodules 10 are longitudinally positioned. In a cross-sectional view of cable 10, the jacket 30 has an inner periphery and an outer periphery (i.e., defined radially).

The jacket 30 may contain one or more longitudinally positioned (e.g., embedded) strength members 50 (i.e., reinforcing members) because the jacket 30 may not be mechanically robust and may be sensitive to temperature changes. The one or more strength members 50 are thus used for limiting the deformations of cable 1 caused by tensile forces (e.g., when laying the cable 1 in a duct) and for limiting axial deformations of cable 1 caused by compression and expansion (e.g., when subjected to significant changes in temperature) by compensating the compression or expansion forces induced by jacket 30.

These strength members 50 may be rods of glass-reinforced plastic (i.e., GRP), stranded or single-strand galvanized steel rods, aramide-reinforced plastic rods, or any other suitable longitudinal reinforcing member for stiffening a telecommunication cable. FIGS. 1A and 1B show an exemplary embodiment in which two strength members 50 are positioned longitudinally within the jacket 30 on either side of central core 20.

FIGS. 1A and 1B also depict a protective envelope 40 surrounding the central core 20. The protective envelope 40 forms a protective contact interface between the micromodules 10 and the jacket 30. This protective envelope 40 may include for example, a plastic tape, (e.g., a polyester tape). This protective envelope 40 protects the micromodules 10 from a metal sheath 60, which may be present between the protective envelope 40 and the jacket 30 when cable 1 is designed for outdoor installations. The protective envelope 40 may include a moisture-absorbing material (e.g., a water-swellable polymer). The protective envelope 40 is typically made of an elastic material that is readily deformed.

To make a bypass in such a telecommunication cable 1, an opening needs to be made in jacket 30 of cable 1. Such an opening is often designated as an access window, which is made through the entire thickness of jacket 30 to gain access to the central core 20. An exemplary access window might have a length of 140 mm and cover about one third of the periphery of cable 1 (i.e., about 120° of the cable circumference). Thereafter, one or more micromodules 10 need to be cut, and then drawn out of cable 1 toward, for instance, a junction box of an optical system.

To create an access window in cable 1, sharp tools (e.g., blades, cutters, cable strippers equipped with blades) are used, often manually. Consequently, the micromodules 10 and optical fibers 15 may be damaged during the process of cutting an access window in the cable 1. Indeed, even when the filling rate of central core 20 of cable 1 is less than 100 percent, (i.e., between 20 percent and 90 percent), the optical fibers 15 or micromodules 10 frequently occupy much of the space inside central core 20 of cable 1. This is so because optical fibers 15 (or micromodules 10) can be freely introduced into the central core 20 with an overlength to limit attenuation and to provide cable 1 with the required performances. As a result, the risk of damaging a micromodule 10 or an optical fiber 15 upon opening an access window is not insignificant.

Furthermore, as noted, for cables 1 intended for outdoor applications, a metal sheath 60 may be placed between the jacket 30 and the protective envelope 40 to protect against corrosion and rodents. This metal sheath 60 may include, for instance, a notched stainless steel tape. Consequently, the cutting of this metal sheath 60 requires a large penetration force. This increases the risk of penetrating the central core 20 and the possibility of damaging the micromodules 10 and/or the optical fibers 15. If a metal sheath 60 is present, the access window is made throughout the thickness of both the jacket 30 and the metal sheath 60. If a protective envelope 40 is also present, it is possible either (i) to make the access window through the protective envelope or (ii) to keep the protective envelope 40 intact. In the latter case, the protective envelope 40 must be opened later (e.g., by cutting) to gain access to the optical fibers 15.

The present invention, therefore, proposes that the micromodules 10 be pushed away (i.e., relocated)—typically toward a section of the central core 20—before performing the cutting of an access window in the periphery of jacket 30. In this way, the access window provides access to the opposite section of the central core 20 and the relocated micromodules 10.

FIG. 1B schematically depicts a cross-section of a cable 1 according to the present invention in which the optical fibers 15 (within micromodules 10) are displaced to a section of the central core 20 opposite the cutout area 200. The micromodules 10 are thus moved away from that section of the central core 20 nearest the cutout area 200. Thus, the risk of damaging a micromodule 10 is considerably reduced. For this reason, the filling rate of the central core 20 of cable 1 should be less than 100 percent (e.g., between 25 percent and 75 percent).

As noted, the invention embraces various embodiments of pushing away optical fibers contained in a central cable core prior to cutting an access window in the cable jacket.

According to a first exemplary embodiment of the present invention illustrated in FIGS. 2 and 3, a radial force F is applied to the cable 1 at two distant points that delineate a cutout area 200. In other words, area 200 is defined by the distance between the two points.

FIG. 2 shows the cable 1 with the freely positioned micromodules 10 (shown as broken lines). A cutout area 200 corresponds to a portion of cable 1 that should be opened to allow one or more micromodules 10 to be bypassed. The cutout area 200 may have been identified beforehand on the jacket 30 of the cable 1 by any suitable means, such as by notches, characters, or color markings. The cutout area 200 may extend over a length from about 10 cm to about 20 cm along the cable 1 and generally covers a half-section of the jacket 30 (in a radial manner) between the strength members 50 on the periphery of the jacket 30. The strength members 50 are generally spared—left untouched—during the cutting of the access windows so as maintain the mechanical integrity of the cable 1.

According to this first embodiment, the micromodules 10 positioned in the cable 1 are pushed away toward a half-section of the central core 20 (i.e., the half-section opposite to the cutout area 200). The micromodules 10 are pushed away by applying a radial force F at two points of the outer periphery of the jacket 30. These two points of applied radial forces F typically lie on either side of the cutout area 200. The radial forces F may be exerted, for example, by two metal rods 110.

To facilitate this procedure, a jig 100 having the shape of the cable 1 may be placed under the cable 1. The jig 100 is located on the opposite side of the cable 1 with respect to the rods 110 in order to avoid bending the cable 1 or causing the cable 1 to become out-of-round under the effect of the radial forces F. Each radial force F causes a localized deformation of the jacket 30 of the cable 1. These localized deformations penetrate toward the inside of the longitudinal central core 20 of the cable 1 and push away the micromodules 10 toward one side of the empty space inside the central core 20. After the micromodules 10 have been relocated in this way, an access window may be opened on the cutout area 200 using a cutting tool with considerably less risk of damaging the micromodules 10 with the cutting tool.

Figure 4:
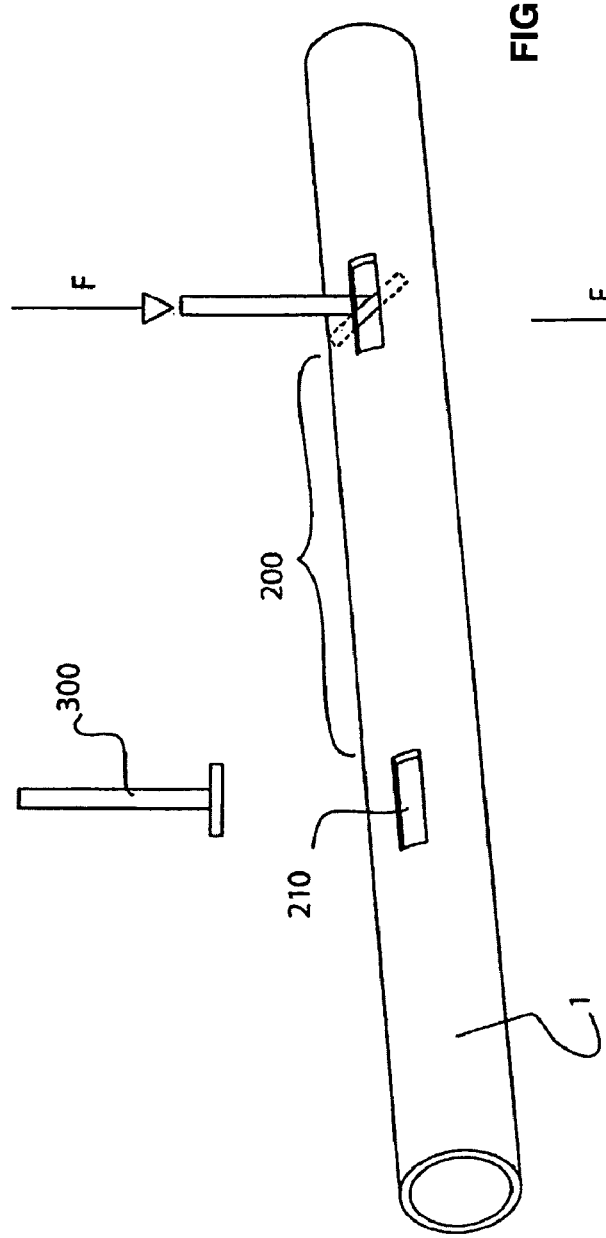
FIG. 4 depicts a perspective view of a cable and a pushing tool for applying the method for accessing one or more optical fibers according to another exemplary embodiment of the invention.
Figure 5:
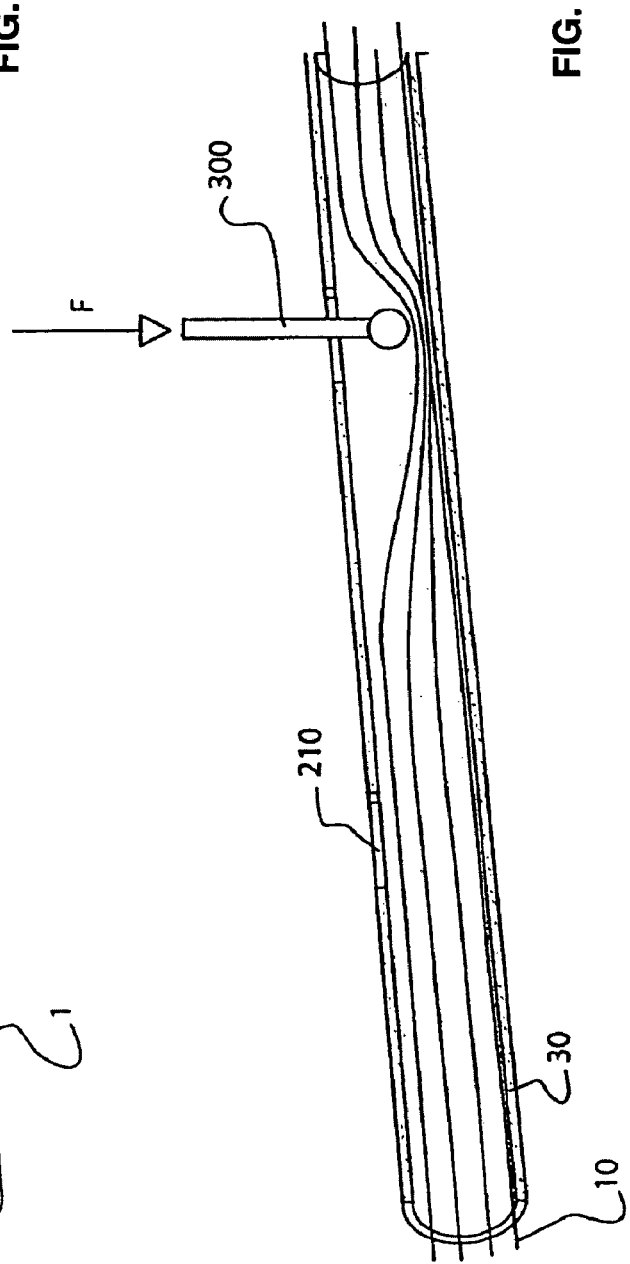
FIG. 5 depicts a longitudinal sectional view of the cable and the pushing tool of FIG. 4.

According to a second exemplary embodiment of the present invention illustrated in FIGS. 4 and 5, a radial force F is directly applied on the micromodules 10 at two points of the cable 1. These two points define the cutout area 200.

According to this embodiment, two small insertion windows 210 are made manually in a longitudinal direction in the jacket 30 of the cable 1. The insertion windows 210 may be made with a mechanical milling cutter or by making a flat opening on the cable 1 with a rasp. These insertion windows 210, which will be used for inserting a pushing tool 300 suitable for pushing away the micromodules 10 toward a half-section of the cable 1. The insertion windows 210 are made in the jacket 30 and through the metal sheath 60, if present. If the protective envelope 40, which is deformable, is present, it will be pushed away—and will not be cut—by the pushing tool 300 at the same time the micromodules 10 are pushed away. In any case, these insertion windows 210 remain small as compared with an access window. The insertion windows 210 are on the order of 4-5 mm (longitudinal direction) by 1-2 mm (transverse direction). Because these insertion windows 210 are small, they may be made with a limited penetration force so as to avoid the cutting tool coming into contact with and possibly damaging the micromodules 10 or the optical fibers 15. These insertion windows 210, therefore, are made without risk of damaging the micromodules 10 or optical fibers 15. The cutout area 200 corresponds to the portion of the cable 1 that is located between both insertion windows 210. Typically, the cutout area 200 extends radially over approximately a half-section of the jacket 30 in between the strength members 50 (e.g., about 120°-180° around the perimeter of the cable 1).

The insertion windows 210 are intended to allow the passage of a pushing tool 300, which can penetrate into the central core 20 of the cable 1 in order to exert a radial force F on the micromodules 10 and to push the micromodules 10 toward a half-section of the cable 1 opposite to the cutout area 200. According to the embodiment illustrated in FIG. 4, the exemplary pushing tool 300 has a T-shape. It is clear upon reading the following description, however, that any other suitable pushing-tool shape may be contemplated to be within the scope of the present invention.

FIG. 5 shows the cable 1 with freely positioned micromodules 10. The micromodules 10 are pushed away toward the half-section of the cable 1 that is opposite to the cutout area 200 by inserting the pushing tool 300 through the insertion windows 210. For example, the T-shaped pushing tool 300 of FIG. 4 may be introduced into the central core 20 of the cable 1 by sliding the bar facing the cable 1 of the T-shaped pushing tool 300 through the longitudinal slot of an insertion window 210 in such a manner that bar is parallel to the longitudinal slot. Then, the field technician (or robot) who carries out the procedure performs a quarter turn with the bar of the T-shaped pushing tool 300 so that the pushing tool 300 may then push away the micromodules 10. This is illustrated in FIG. 5. After the micromodules 10 have been pushed away, an access window may be opened on the cutout area 200 between the two insertion windows 210 using a cutting tool. This procedure considerably reduces the risk of damaging the micromodules 10 with the cutting tool.

According to a third exemplary embodiment of the present invention illustrated in FIGS. 6 and 7, the insertion windows 210 are transversely formed in the jacket 30 of the cable 1 (rather than longitudinally as depicted in FIG. 4). These insertion windows 210 may be made using mechanical milling cutter or using a rasp. The shape of the insertion windows 210 should accommodate the shape of the pushing tool 310 to be inserted into the central core 20 of the cable 1 (i.e., to relocate the micromodules 10). In any case, these insertion windows 210 remain small as compared with an access window. The insertion windows 210 are on the order of 4-5 mm (transverse direction) by 1-2 mm (longitudinal direction).

According to this third embodiment, the pushing tool 310 includes a system of connected members (i.e., legs) that are respectively slid through the insertion windows 210 made in the jacket 30 of the cable 1. These pushing-tool legs are suitable for exerting a radial force F directly on the micromodules 10 (i.e., at two points within the cable 1 corresponding to the cutout area 200).

For example, the legs of the pushing tool 310 may have an L-shape. A radial force F may be applied to a bar that connects the legs together. A component of this radial force F is thus transmitted to each leg of the pushing tool 310 in order to push the micromodules 10 from the cutout area 200. After the micromodules 10 have been pushed away, an access window may be opened on the cutout area 200 between the two insertion windows 210 using a cutting tool. As before, this procedure considerably reduces the risk of damaging the micromodules 10 with the cutting tool.

Figure 8:
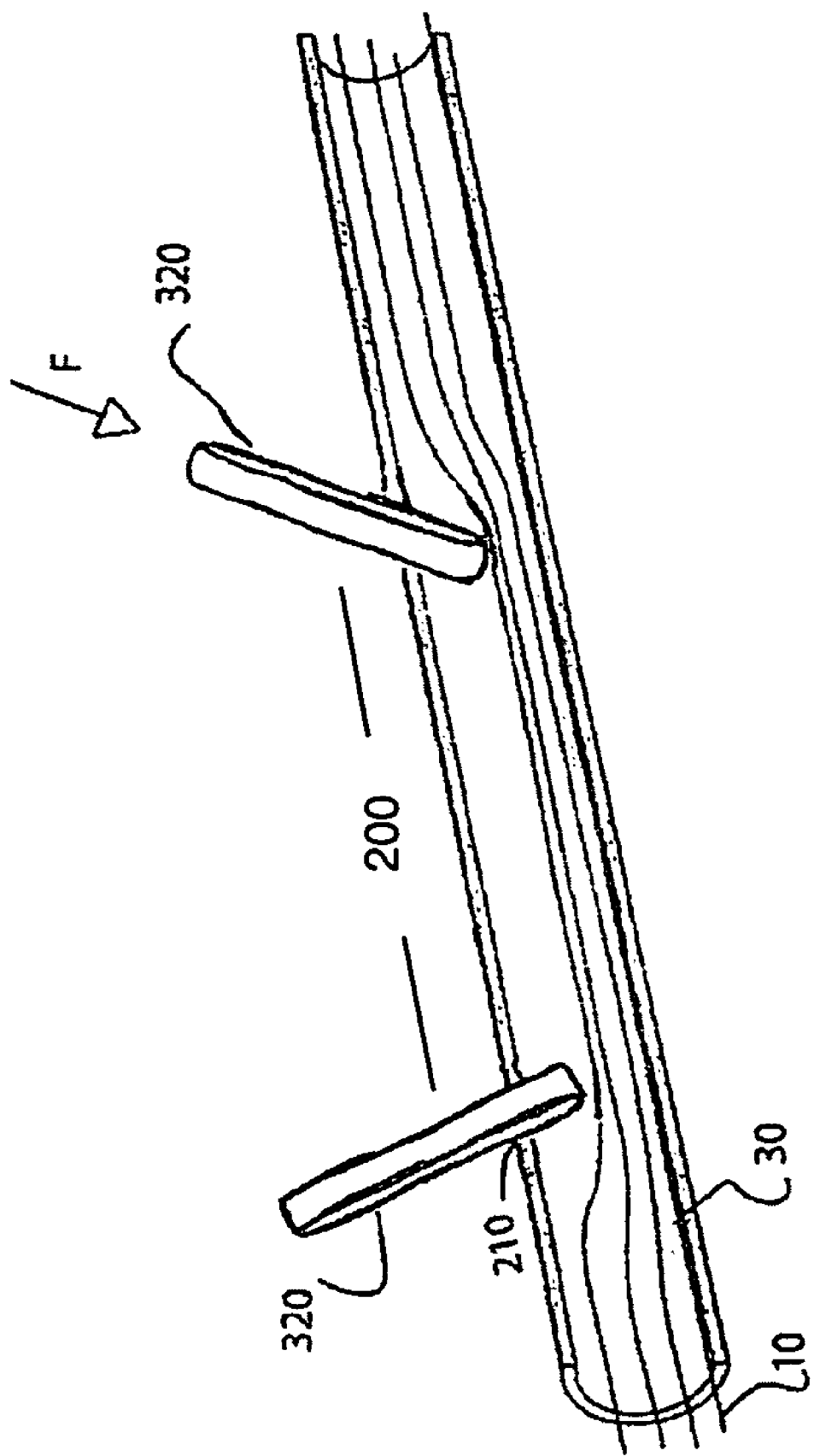
FIG. 8 depicts a longitudinal sectional view of a cable and a pushing tool for applying the method for accessing one or more optical fibers according to yet another exemplary embodiment of the invention.

According to a fourth exemplary embodiment of the present invention illustrated in FIG. 8, the pushing tool 320 is a wedge that is slid through respective insertion windows 210 formed in the jacket 30 of the cable 1. The wedge tool 320, for example, may be a flat rectangular tool with rounded ends (e.g., formed from wood). Exemplary wedge tool 320 dimensions are a length of 60 mm to 100 mm (e.g., about 80 mm), a width of 4 mm to 8 mm (e.g., about 6 mm), and a thickness of 0.5 mm to 3 mm (e.g., about 1 mm). Each wedge tool 320 may be introduced at an incline (i.e., angled) through the insertion windows 210 in order to further push away the micromodules 10 (i) radially toward the half-section of the central core 20 that is opposite the half-section of the central core 20 on which periphery the cutout area 200 is located and (ii) longitudinally into a portion of the central core 20 that is located in the center of the cutout area 200. In any case, the force F exerted on the micromodules 10 by the wedge tools 320 includes a radial component, which displaces the micromodules 10 away from the cutout area 200. After the micromodules 10 have been pushed away, an access window may be opened on the cutout area 200 between the two insertion windows 210 using a cutting tool. As before, this procedure considerably reduces the risk of damaging the micromodules 10 with the cutting tool.

Figure 9:
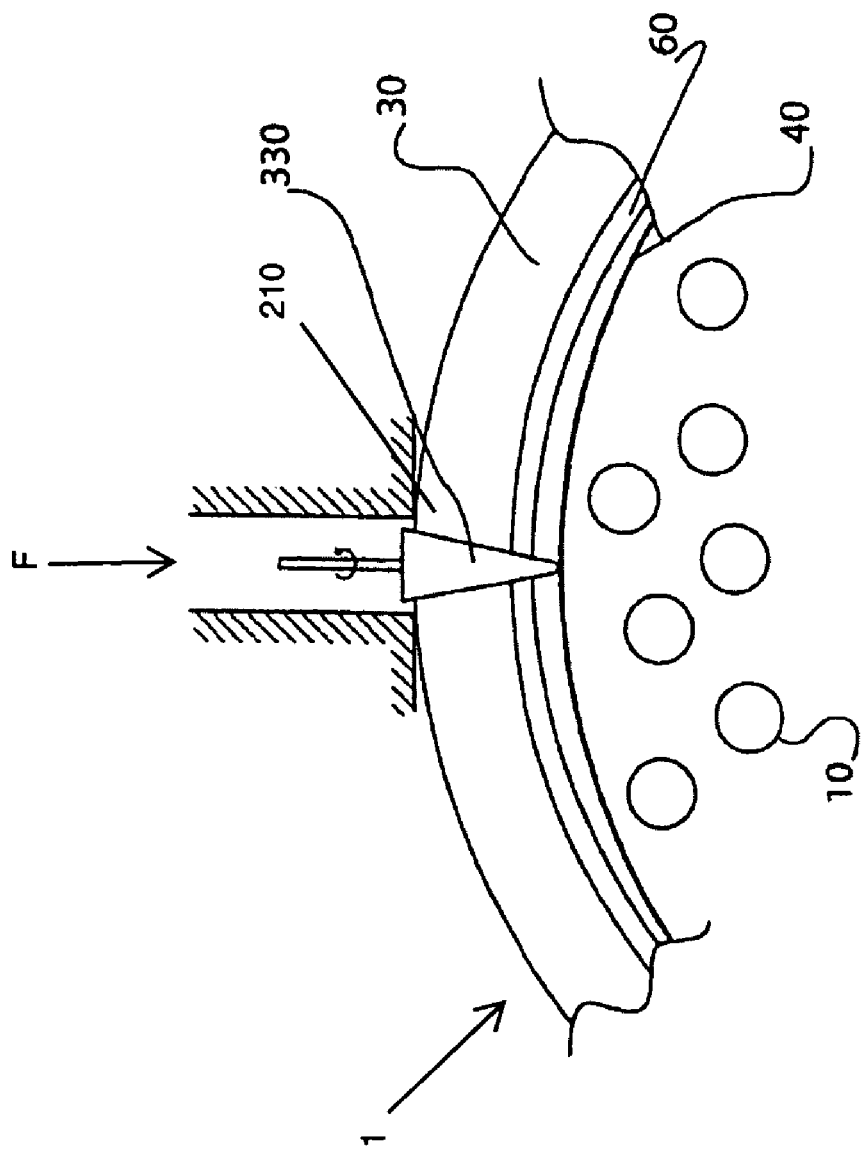
FIG. 9 depicts a partial cross-sectional view of a cable and a pushing-and-cutting tool for applying the method for accessing one or more optical fibers according to yet another exemplary embodiment of the invention.

FIG. 9 illustrates a method for cutting an insertion window 210 on the jacket 30 of the cable 1 according to the present invention. According to this embodiment, opening an access window in the jacket 30 of the cable 1 may be achieved with a suitable mechanical milling cutter 330 while gradually pushing away the micromodules 10 (i.e., containing optical fibers 15) during the cutting procedure. The miller cutter 330 may also be employed to cut out the large access window.

Figure 10:
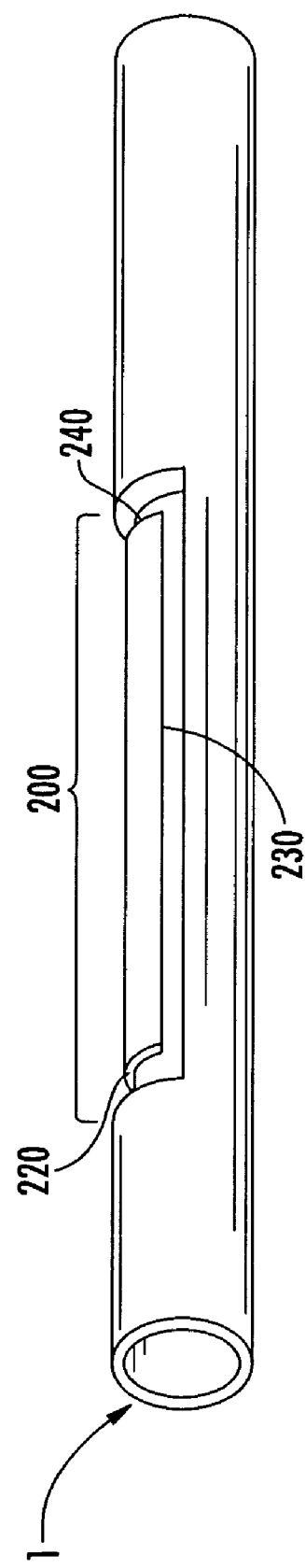
FIG. 10 is a perspective view of the opening made by the pushing-and-cutting tool depicted in FIG. 9.

To do so, the miller cutter 330 is first inserted through the jacket 30 (and optional metal sheath 60) without damaging the protective envelope 40, which is pushed away as depicted in FIG. 9. In this manner, the insertion window 210 is formed. Thereafter, the miller cutter 330 may be moved transversely over the cable 1 to mill out material of jacket 30 and form a first transverse opening 220 that extends, for instance, partially around the periphery of the cable 1 (e.g., about 120° to 180° as shown in FIG. 10). Next, the miller cutter 330 is moved longitudinally over the cable 1 milling out material of jacket 30 to make a longitudinal opening 230, followed by a second transverse opening 240 that is made parallel to the first opening 220. This allows the jacket 30 to be folded open (i.e., at a flap) to gain access to the contents of the cable 1 (e.g., the micromodules 10 and/or fibers 15 surrounded by the protective envelope 40). It is also possible, of course, to make a fourth longitudinal opening (not shown) to complete the access window (i.e., by removing the piece of the jacket 30 that has been cut out).

A mechanical milling cutter 330 (e.g., a DREMEL® tool) having, for instance, a conical profile as illustrated in FIG. 9 (or with a rectangular profile) is calibrated for a penetration depth into the cable 1 sufficient for piercing the jacket 30 and the metal sheath 60. By way of example, the mechanical milling cutter 330 is calibrated to penetrate past the metal sheath 60 by only about 1 mm. The milling cutter 330 may be driven by a small electric motor, particularly if it has to pierce metal sheath 60 (e.g., a stainless steel sheath 60).

As noted, the micromodules 10 may be surrounded by a protective envelope 40 that is flexible and thin (about 35-75 μm). The milling cutter 330 will directly push away the micromodules 10 by pressing on the protective envelope 40 without piercing it. In this way, the micromodules 10 are moved away from the cutout area 200 of the access window by the deformation of the protective envelope 40. The protective envelope 40 moves toward the inside of the central core 20 under the action of the milling cutter 330 (i.e., without the protective envelope 40 being damaged). The micromodules 10 thereby remain well protected. According to this embodiment of the present invention, one tool—the mechanical milling cutter 330—both pushed and cuts (i.e., exerts a radial force F on the micromodules 10 and performs the cutting-out of the jacket 30 of the cable 1 near the point on the cable 1 where the radial force F is exerted).

Those having ordinary skill in the art will recognize that it is possible to cut the metal sheath 60 and/or the jacket 30 by fully withdrawing the milling cutter 330, whereby a displacement force is not necessarily maintained upon the protective envelope 40 and the micromodules 10 (i.e., containing optical fibers 15). As a practical matter, however, deformation of the protective envelope 40 ought to be maintained throughout most of the cutting procedure (i.e., substantially maintained) to achieve the access window.

Before cutting out an access window while pushing away the micromodules 10 (e.g., by gradual deformation of the protective envelope 40), the cable 1 may be positioned (bent) beforehand so that the cutout area 200 is located on a convex section of the cable 1. Concave and convex cable deformations are illustrated in FIGS. 11 and 12, respectively.

Indeed, in the case when the central core 20 is tensioned in the cable 1 (e.g., as a result of installation or manufacturing stresses), the micromodules 10 will adopt the shortest path when the cable 1 is bent. Because the filling rate is less than 100 percent, there is sufficient space inside the central core 20 for the micromodules 10 to follow a shortened path.

By way of example, if the access window should be made on a concave portion of the cable as depicted in FIG. 11, the milling cutter 330 may damage the protective envelope 40 and the micromodules 10, which will be strongly pressed against the jacket 30 of the cable 1. It is possible, however, to slightly twist the cable as depicted in FIG. 12 so that the cutout area 200 is instead on a convex portion of the cable 1. In this way, the micromodules 10 are then pressed in the opposite concave portion.

The present invention is not limited to the exemplary embodiments described herein. For example, a single exertion point of a force (i.e., having a radial component) may be provided to move the micromodules 10 or optical fibers 15 away from the cutout area 200. In this case, the exertion point of the radial force exerted on the micromodules 10 or optical fibers 15 is centrally positioned within to the cutout area 200. Alternatively, three or more exertion points of a force (i.e., having radial components) may be provided for pushing the micromodules 10 or optical fibers 15. Furthermore, the shapes and the dimensions of the pushing tools 300, 310, 320 suitable for pushing away the micromodules 10 or optical fibers 15 may vary from the illustrative examples, and the exemplary embodiments described herein may be used in combination with each other.

This application incorporates entirely by reference commonly assigned U.S. patent application Ser. No. 11/938,280 for a Telecommunication Optical Fiber Cable, filed Nov. 10, 2007.

In the specification and drawings, typical embodiments of the invention have been disclosed. The present invention is not limited to such exemplary embodiments. Unless otherwise noted, specific terms have been used in a generic and descriptive sense and not for purposes of limitation.

The invention claimed is:

1. A method for accessing one or more optical fibers of a telecommunication cable, comprising:
    providing a cable that includes (i) a cable jacket defining a central cable core and (ii) a plurality of optical fibers freely positioned within the central cable core;
    identifying a cutout area on the outer periphery of the cable jacket from which at least one access window is formed;
    pushing at least some of the optical fibers to a section of the central cable core that is away from the cutout area by exerting, upon at least some of the optical fibers at two or more longitudinally distant points, a force (F) having at least one radial component with respect to the cable; and
    performing a cutout in the cable jacket in the cutout area while substantially maintaining the force (F) upon at least some of the optical fibers to form at least one access window.

2. The method according to claim 1, wherein the force (F) exerted upon at least some of the optical fibers is effected by exerting a force (F') on the outer periphery of the cable jacket.

3. The method according to claim 2, wherein the step of exerting a force (F') on the outer periphery of the cable jacket comprises exerting the force (F') upon at least two longitudinally distant points on the cable jacket, the longitudinally distant points being located on the cutout area.

4. The method according to claim 1, further comprising the step of forming near and/or within a portion of the cutout area an insertion window, wherein the subsequent pushing step comprises exerting the force (F) upon at least some of the optical fibers through the insertion window.

5. The method according to claim 4, wherein the step of exerting the force (F) upon at least some of the optical fibers comprises exerting the force (F) upon at least some of the optical fibers using a pushing tool that accesses the optical fibers via the insertion window.

6. The method according to claim 4, wherein the insertion window has an opening that is between about 4 mm$^2$ and 10 mm$^2$.

7. The method according to claim 1, wherein:
the cable further includes (iii) a protective envelope that surrounds the central core and (iv) a metal sheath that surrounds the protective envelope; and
the cable jacket surrounds both the protective envelope and the metal sheath, whereby the metal sheath is positioned between the protective envelope and the cable jacket.

8. The method according to claim 7, wherein the step of pushing the optical fibers and the step of performing a cutout in the cable jacket are carried out concurrently using a pushing-and-cutting tool that pierces the cable jacket and the metal sheath and deforms the protective envelope to exert a force (F) upon at least some of the optical fibers.

9. The method according to claim 8, wherein the pushing-and-cutting tool comprises a mechanical milling cutter that is calibrated to penetrate into the cable beyond the cable jacket and the metal sheath.

10. The method according to claim 1, wherein at least some of the optical fibers are grouped within at least one micromodule.

11. The method according to claim 10, wherein the plurality of optical fibers and at least one micromodule occupy the central cable core with a filling rate of between about 20 percent and 90 percent.

12. A method for accessing one or more optical fibers of a telecommunication cable, comprising:

providing a cable that includes (i) a cable jacket defining a central cable core, (ii) a micromodule positioned within the central cable core, and (iii) one or more optical fibers positioned within the micromodule;
delineating a cutout area on the cable jacket;
displacing the micromodule away from the cutout area by exerting a displacement force upon the micromodule at two or more longitudinally distant points; and
cutting an access window within the delineated cutout area and through the cable jacket while essentially maintaining a displacement force upon the micromodule.

13. The method according to claim 12, further comprising the step of creating one or more insertion windows near and/or within the delineated cutout area.

14. The method according to claim 13, wherein the step of displacing the micromodule from the cutout area comprises inserting a pushing tool through at least one insertion window to exert the displacement force upon the micromodule.

15. The method according to claim 12, wherein the step of providing a cable comprises providing a cable that further includes (iv) a metal sheath positioned at the inner periphery of the cable jacket and (v) a protective envelope positioned at the inner periphery of the metal sheath such that the micromodule is positioned within the protective envelope.

16. The method according to claim 15, further comprising the step of creating one or more insertion windows within the delineated cutout area through both the cable jacket and the metal sheath, and wherein the step of displacing the micromodule from the cutout area comprises inserting a pushing tool through at least one insertion window to exert the displacement force upon the micromodule.

17. The method according to claim 15, wherein the step of displacing the micromodule and the step of cutting an access window are carried out simultaneously using a pushing-and-cutting tool that cuts the cable jacket and the metal sheath and deforms the protective envelope to exert a displacement force upon the micromodule.

18. The method according to claim 17, wherein the pushing-and-cutting tool comprises a mechanical milling cutter that is calibrated to penetrate into the cable beyond the cable jacket and the metal sheath.

19. The method according to claim 14, wherein the insertion window has an opening that is between about 4 mm$^2$ and 10 mm$^2$.

* * * * *